United States Patent
Ou

(10) Patent No.: US 6,588,787 B2
(45) Date of Patent: Jul. 8, 2003

(54) FOLDABLE ELECTRIC VEHICLE FOR RECREATION AND TRAVELING

(75) Inventor: Pao-Yin Ou, Hsinchu (TW)

(73) Assignees: Hamba R & D Co., Ltd., Taipei (TW); Wuxi Top Absorber Company Limited, Jiangsu (CN)

( * ) Notice: Subject to any disclaimer, the term of this patent is extended or adjusted under 35 U.S.C. 154(b) by 0 days.

(21) Appl. No.: 09/988,519

(22) Filed: Nov. 20, 2001

(65) Prior Publication Data

US 2003/0051934 A1 Mar. 20, 2003

(30) Foreign Application Priority Data

Sep. 14, 2001 (TW) ....................................... 90215905 U

(51) Int. Cl.[7] .............................................. B62K 15/00
(52) U.S. Cl. .................... 280/287; 280/278; 280/87.05; 180/220
(58) Field of Search ................................. 180/218, 220, 180/65.1, 180, 181; 280/87.041, 87.05, 278, 287, 274, 206, 208; D21/423; D12/110

(56) References Cited

U.S. PATENT DOCUMENTS

| 496,093 | A | * | 4/1893 | Okey | 280/274 |
|---|---|---|---|---|---|
| 653,583 | A | * | 7/1900 | Paxson | 242/533.6 |
| 1,395,974 | A | * | 11/1921 | Redfield | 280/727 |
| 3,354,976 | A | * | 11/1967 | Camps | 180/208 |
| 3,419,283 | A | * | 12/1968 | Newland | 280/278 |
| 4,097,055 | A | * | 6/1978 | Laycraft | 280/16 |
| 4,830,133 | A | * | 5/1989 | Gaddi | 180/208 |
| 5,183,129 | A | * | 2/1993 | Powell | 180/208 |
| 5,611,557 | A | * | 3/1997 | Farris et al. | 280/275 |
| 5,848,660 | A | * | 12/1998 | McGreen | 180/206 |
| D456,460 | S | * | 4/2002 | Tseng | D21/423 |
| 6,390,216 | B1 | * | 5/2002 | Sueshige et al. | 180/208 |
| 6,457,544 | B1 | * | 10/2002 | Sung | 180/220 |
| D466,839 | S | * | 12/2002 | Ou | D12/110 |

FOREIGN PATENT DOCUMENTS

| FR | 2715123 A1 | * | 7/1995 | .............. B62J/1/02 |
|---|---|---|---|---|
| FR | 2818608 A1 | * | 6/2002 | ............ B62K/3/00 |

* cited by examiner

Primary Examiner—Lesley D. Morris
Assistant Examiner—Daniel Yeagley
(74) Attorney, Agent, or Firm—Troxell Law Office PLLC

(57) ABSTRACT

The present invention discloses a foldable electric vehicle for recreation and travelling, which may provide an electric activation to make a recreation-travelling vehicle march forward without the auxiliary of manpower and also provide a seat for a user to be seated on. The main function of the invention is to provide a foldable and closeable framework that not only makes the invention easy to carry but also occupies smaller space. Through the design of a pivot connection axis, it may make a main vehicle frame and a direction-changing axis fixation seat of the invention able to be drawn in and leaned together. A chair frame may also be designed above the main vehicle and be leaned together on the main vehicle frame when the vehicle body is folded together. Thus, a foldable and closeable framework provided by the present invention is formed. Preferably, the handgrips may be matched with the vehicle body to be folded and closed together through a quick taking-apart set.

12 Claims, 9 Drawing Sheets

FOLDABLE ELECTRIC VEHICLE FOR RECREATION AND TRAVELING

FIELD OF THE INVENTION

The present invention relates to a foldable electric vehicle for recreation and travelling, especially to a foldable and closeable structure for an electric recreation-and-travelling vehicle that may provide a user to be seated on or stand up.

BACKGROUND OF THE INVENTION

In general, the sliding-board vehicle of the prior arts usually has a front wheel, a back wheel, and a striding board between the front and back wheels. And, a handgrip is extended upwards from the front fork frame at the top of the front wheel and two sides of the top. The handgrip not only may provide the user to grip to control the advancing direction of the sliding-board vehicle, but also may provide the user to control the balance of his body. The sliding-board vehicle is made to slide forward by that one foot of the user steps on the striding board and another foot treads on ground to relatively generate a force of pushing forward from the point of treading. Another electric sliding-board vehicle of the prior arts is then arranged with a transmission mechanism, through which a wheel positioned at the skeleton is driven. When a user stands on the treadle and activates the transmission mechanism, the sliding-board vehicle is then made to march forward. However, the variation and convenience of usage for the electric sliding-board vehicle are all slightly insufficient. When the electric sliding-board vehicle is advancing, the user only has to stand on the striding board. When the electric sliding-board vehicle is in idle, it also has to find an appropriate space to place it in. Since the structure design of general electric sliding-board vehicle is all restricted within a common manner of design of striding board positioned between the front and back wheels, so it lacks convenience and variation no matter on structure design or in entirety and therefore it has a great room to be improved. If a convenience of taking along and a position available for sitting on may also be designed according to the entire structure of the vehicle body, then they may provide a better performance and convenience.

SUMMARY OF THE INVENTION

The present invention is a further improvement for resolving above shortcomings generated form the prior arts. The main object of the present invention is through design to provide a framework of vehicle body capable of folding and closing together to make the invention get a preferable and convenient variation of structure during usage and taking along.

Another object of the present invention is to provide an electric actuation for making the recreation-and-travelling vehicle march forward without the auxiliary of manpower and provide a seat for the user to be seated on optionally.

The preferable embodiment of the invention includes: a front wheel, a back wheel, a direction-changing axis, a main vehicle frame, a direction-changing axis fixation seat, and a chair frame. Wherein, the front and back wheels are installed at the front and back of the vehicle body to provide the invention to move forward. A shock absorber is arranged above the front wheel to reduce the vibration of the vehicle body during marching forward. A direction-changing axis fixation seat is provided to connect a direction-changing axis to the shock absorber and also provide a supporting force to the direction-changing axis. A quick taking-apart set is applied to connect the top of the direction-changing axis and secure a pair of handgrips. The quick taking-apart set may control the angle and position of the handgrips and let the user adjust appropriate position according to his height for facilitating the user to grip the handgrips.

A first pivot connection axis connects the front of the main vehicle frame to the direction-changing fixation seat and is extended backward to the back wheel. The front is inset and connected to the direction-changing axis and at the part of insetting-and-connection the first pivot connection axis penetrates through both direction-changing axis fixation seat and main vehicle frame for providing the forces of rotation and support. A fixation knob may secure both direction-changing axis fixation seat and main vehicle frame at an appropriate position. When the vehicle body is folded together, the fixation knob is then loosen to be able to make both direction-changing axis fixation seat and main vehicle frame be drawn in and leaned together.

A hollow cavity room at the middle position of the main vehicle frame may be placed in several chargeable batteries for providing the transmission mechanism sufficient electric power to drive the vehicle body. A control box may control the speed of the transmission mechanism. The transmission mechanism acts along a belt that further acts along the back wheel.

A chair frame is arranged at the top of the main vehicle frame through a second pivot connection axis. The second pivot connection axis penetrates through the main vehicle frame to make itself become a supporting axis for rotating and moving the position of the chair frame and also provide a supporting force.

DETAILED DESCRIPTION OF THE PREFERRED EMBODIMENT

The present invention discloses an electric, foldable, and dual-purpose vehicle for recreation and travelling, which is a further improvement for traditional sliding vehicle, and which includes the provision of electric actuation to make the recreation-and-travelling vehicle march forward without the auxiliary of manpower and the provision of a seat for a user to be seated on. The present invention mainly provides a foldable and closeable framework that not only makes the present invention easy to carry but also does not occupy too large space. For the provision of electric power, it not only can charge the batteries by a common manner of socket charging, but also it can be designed as that the vehicle is placed in the rear trunk of a car and through a charging terminal the vehicle is charged by the electric power supplied by the car.

Figure 1:
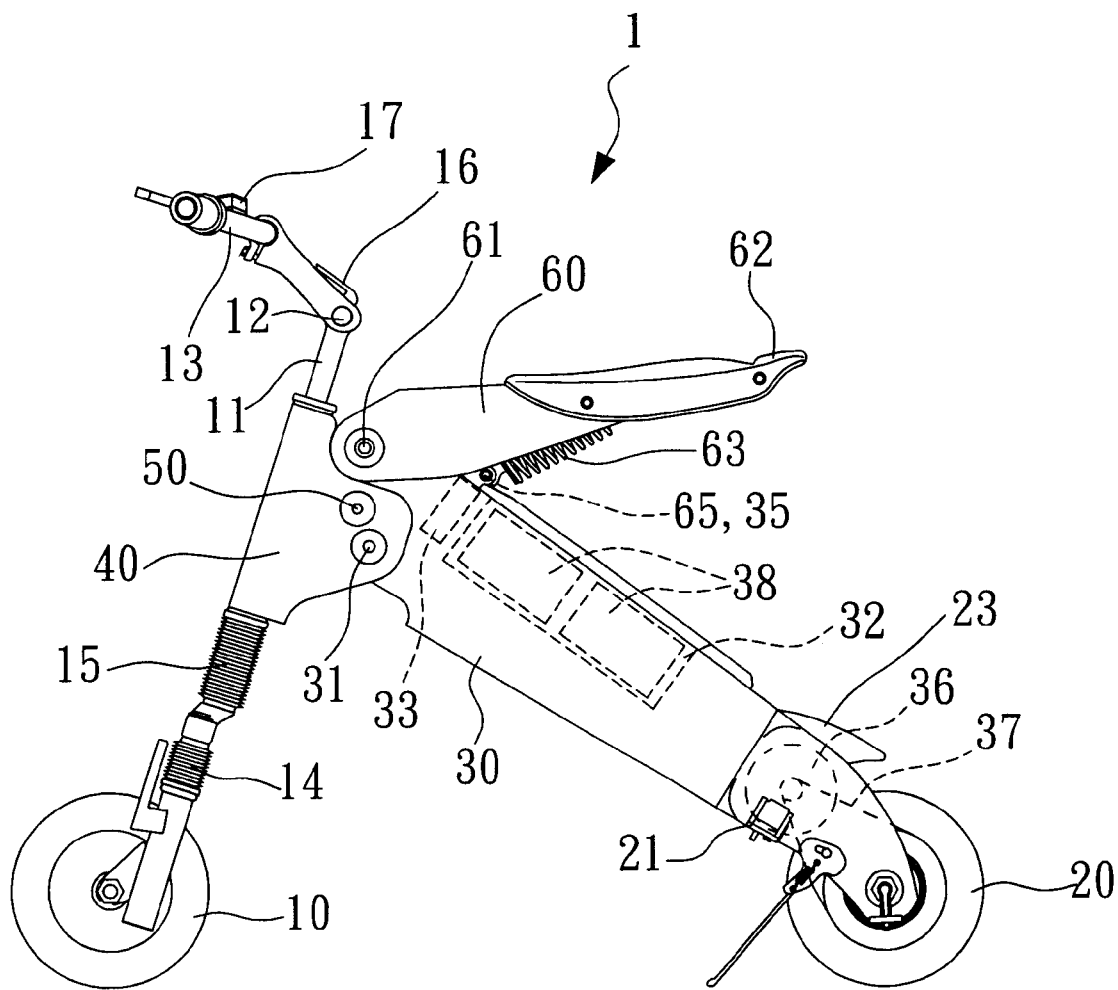
FIG. 1 is a side view for a preferable embodiment according to the present invention.
Figure 2:
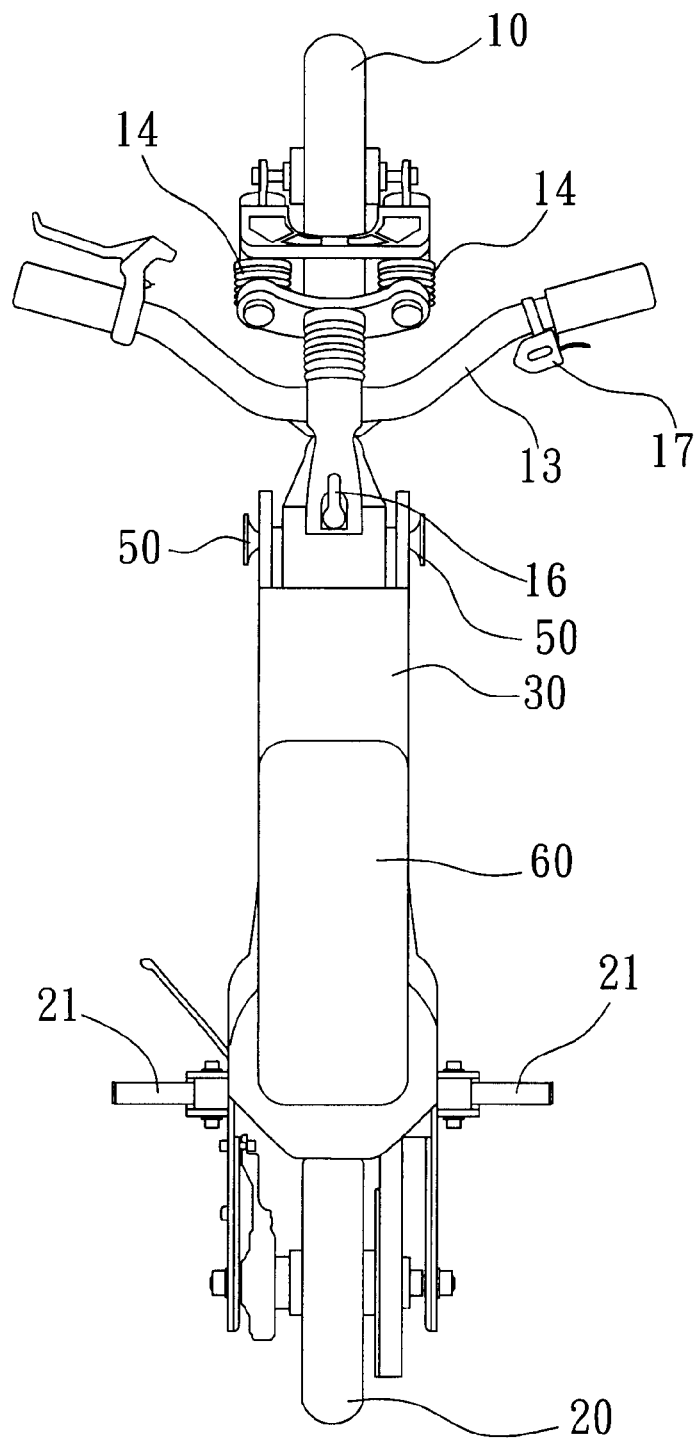
FIG. 2 is a vertical view for a preferable embodiment according to the present invention.

Please refer to FIG. 1 and FIG. 2, which are the side view and vertical view of the preferable embodiment according to the present invention respectively. The present invention has a front wheel 10, a back wheel 20, a direction-changing axis 11, a main vehicle frame 30, a direction-changing axis fixation seat 40, and a chair frame 60. Wherein the front and back wheels 10, 20 are arranged at the front and back positions of the vehicle respectively to provide the movement and marching forward for the invention. There are shock absorbers 14, 15 arranged above the front wheel 10 to reduce the vibration of vehicle body during advancing forward. A direction-changing axis fixation seat 40 is provided to connect the direction-changing axis 11 to the shock absorber 15, provide a supporting force to support the direction-changing axis, and also provide a direction change for the direction-changing axis to further control the marching direction of the entire vehicle body. A quick taking-apart set 12 connects the top of the direction-changing axis 11 and secures a pair of handgrips 13. The quick taking-apart set 12 further includes a knob handle 16 to control the angle and position of the handgrips to make the user adjust an appropriate position for facilitating himself to grip and also provide a preferable manner for user to carry and place, when the invention is formed as a state of folding together.

The front end of a main vehicle frame 30 is connected to the direction-changing axis fixation seat 40 through a first pivot connection axis 31. The main vehicle frame 30 is also extended backward to a back wheel 20. The back end of the main vehicle frame 30 is designed above the back wheel 20. The front end of the main vehicle frame 30 is inset and connected to the back end of the direction-changing axis fixation seat 40. Under the insetting and connecting part, a pivot connection axis 31 penetrates through both direction-changing axis fixation seat 40 and main vehicle frame 30 to make itself formed as a rotating and supporting force for both main vehicle frame 30 and direction-changing axis fixation seat 40. A fixation knob 50 may fix both direction-changing axis fixation seat 40 and main vehicle frame 30 at an appropriate position. The direction-changing axis fixation seat 40 and the main vehicle frame 30 are secured at an appropriate position without shaking by tightening up the fixation knob 50. When the vehicle body 1 is going to be folded together, the fixation knob 50 is then loosened to make both direction-changing axis fixation seat 40 and main vehicle frame 30 be drawn in and leaned together through the first pivot connection axis 31.

A hollow cavity room 32 is further arranged at the middle position of the main vehicle frame 30. Several chargeable batteries 38 may be placed in the hollow cavity room 32 to provide the transmission mechanism 36 sufficient electric power to drive the vehicle body. The speed of the transmission mechanism 36 is controlled through a controlling box 33. The transmission mechanism 36 acts along a belt 37 that further acts along the back wheel 20. A mudguard 23 is designed above the back of the main vehicle frame 30 and in the neighborhood of the top of the back wheel 20. In the future, when the back wheel 20 is at advancing, the brought along silt and miscellaneous objects will be blocked and eliminated.

A chair frame 60 is also arranged above the main vehicle frame 30 through a second pivot connection axis 61. The front two sides of the chair frame 60 are connected over the front two sides of the main vehicle frame 30 and are pivotally connected with the second pivot connection axis 61 that penetrates through the major vehicle frame 30 to make the second pivot connection axis 61 become a supporting axis for the rotation and displacement of position of the chair frame 60 and further provide a supporting force. A seat cushion 62 conforming to the ergonomics may also be designed above the chair frame 60 to make the user have a more comfortable sense of sitting. An adjustable shock absorber 63 is pivotally connected and arranged at the middle position of the bottom end of the chair frame 60. The adjustable shock absorber 63 may adjust the height of the chair frame 60 according to the weight of user to make him get a preferable angle of sitting. Two extension legs 65 extending in opposite directions are arranged at the bottom of the shock absorber 63 and may be inserted into two positioning holes 35 at the top of the main vehicle frame 30. When the user is going to use the chair frame 60, the adjustable shock absorber 63 may be immediately inserted into two positioning holes 35 and is then adjusted to an appropriate height. Therefore, the shock absorber 63 not only has the effect of shock absorption but also has the function for adjusting the height of chair frame 60 to further make the user have the comfort of sitting, preferable adjustment and control.

The starter 17 may be arranged on the left or right handgrips 13. The starter 17 is also connected to the controlling box 33 to further drive the transmission mechanism 36 that further acts along the back wheel 20 to march forward after being started. The foot treadles 21 are arranged at two sides of the back of the major vehicle frame 30 and in the neighborhood of the back wheel 20. The foot treadles 21 may provide the user to place his two feet on.

Figure 3:
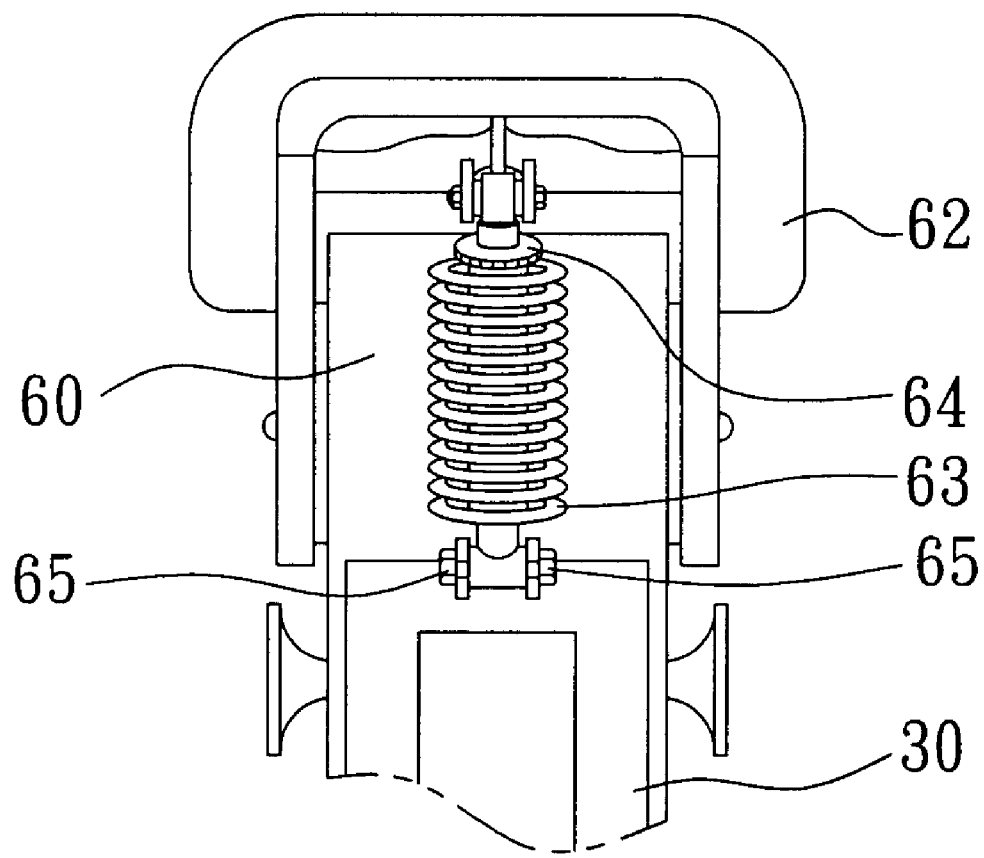
FIG. 3 is an illustration for a rear view and local enlargement for a preferable embodiment of an adjustable shock absorber according to the present invention.
Figure 4:
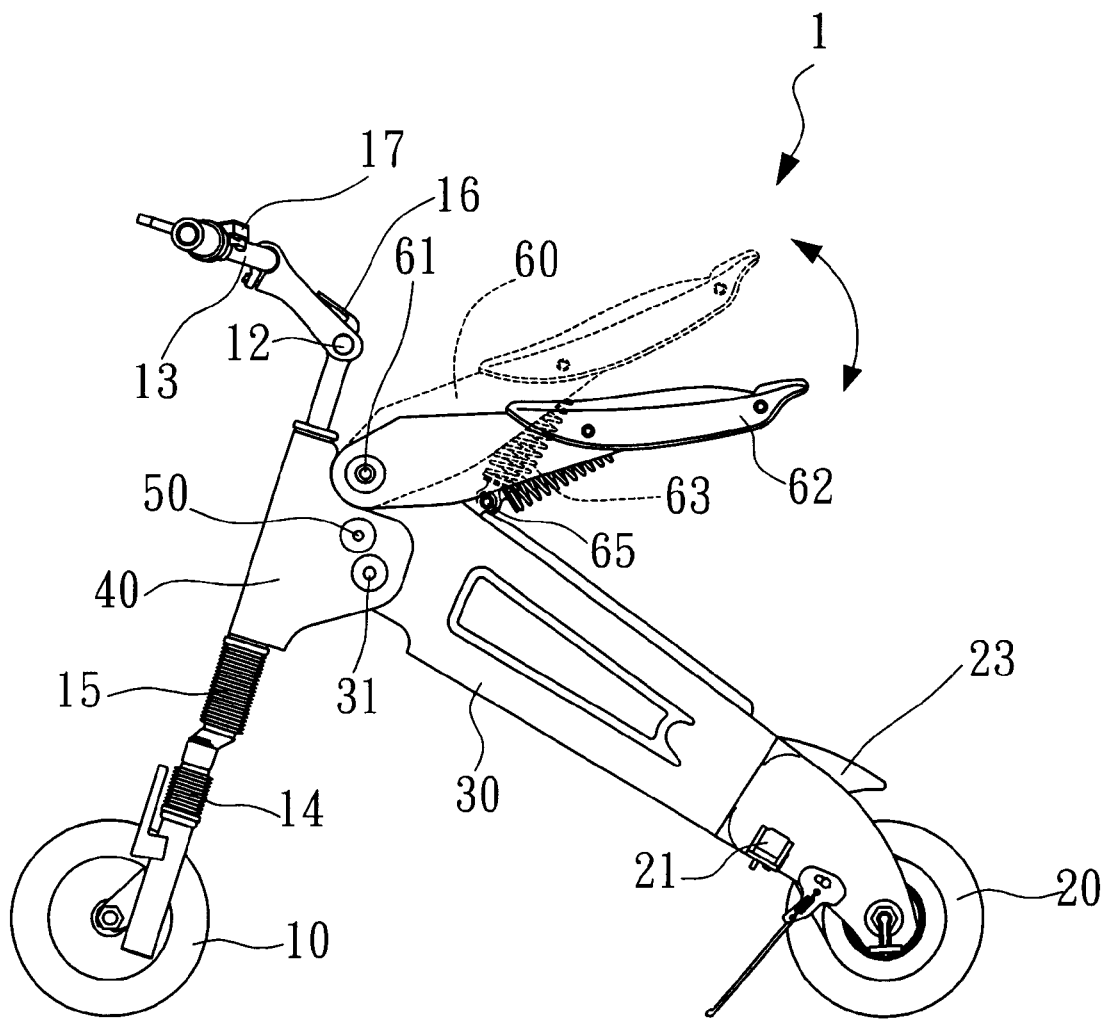
FIG. 4 is an illustration for a preferable embodiment for a chair frame according to the present invention during the procedure of folding together.
Figure 5:
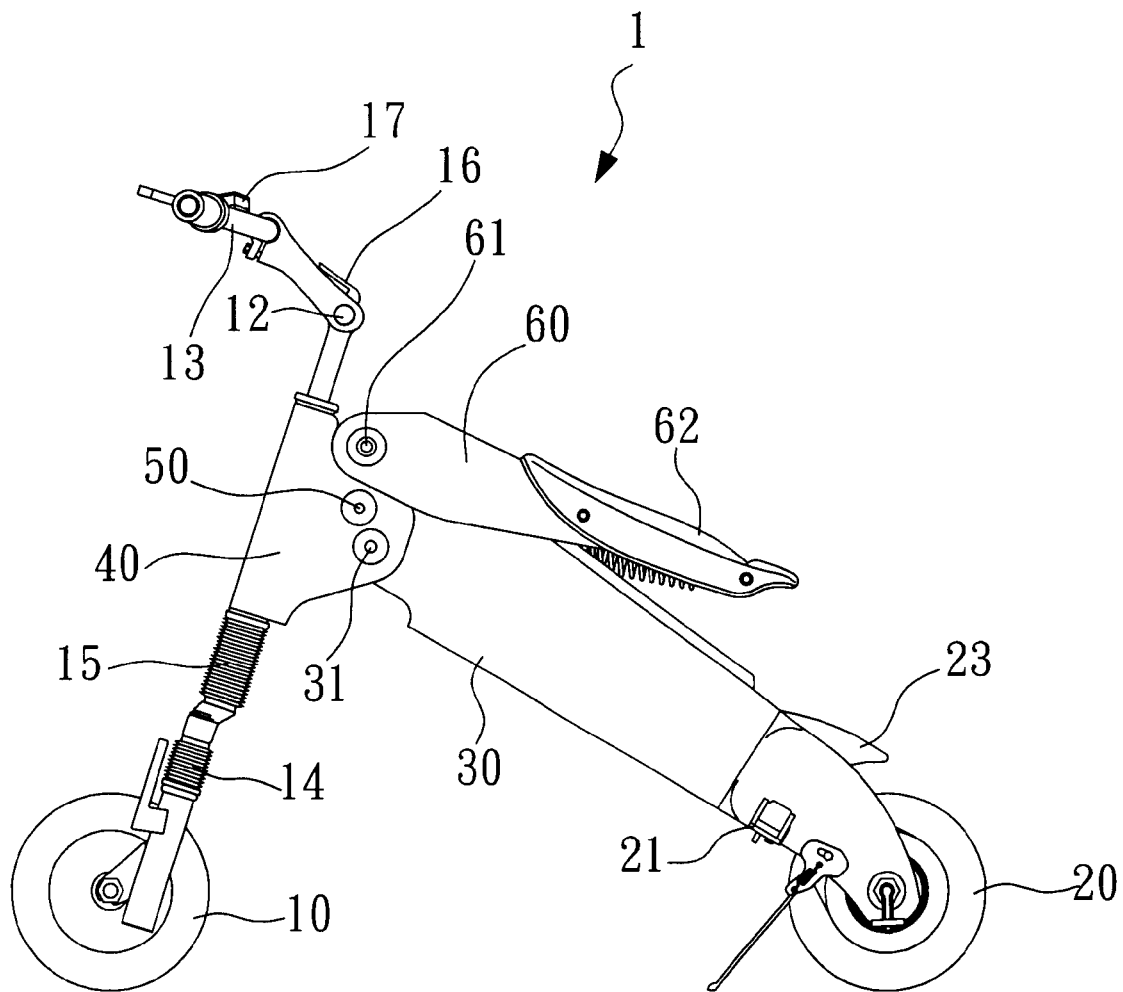
FIG. 5 is an illustration of a side view for a preferable embodiment of a chair frame according to the present invention that has been folded together.

Please refer to FIG. 3, FIG. 4, and FIG. 5. FIG. 3 is an illustration of a rear view and local enlargement for an adjustable shock absorber according to the present invention. FIG. 4 is an illustration for a preferable embodiment for a chair frame according to the present invention during the procedure of folding together. FIG. 5 is an illustration of a side view for a preferable embodiment of a chair frame according to the present invention that has been folded together. According to FIG. 3, an adjusting knob 64 is arranged above the adjustable shock absorber 63. When the height of the chair frame 60 or the weight of the user is needed to adjust, the adjusting knob 64 is adjusted. When the chair frame 60 is folded to one side of the main vehicle frame 30, two extension legs 65 that were inset and connected in the positioning holes 65 may be removed from the two positioning holes. According to FIG. 4, the chair frame 60 is arranged above the main vehicle frame 30 through the second pivot connection axis 61. Two sides of the front end of the chair frame 60 are connected over the two sides of the front of the main vehicle body 30 and are connected with the second pivot connection axis 61 that penetrates through the main vehicle frame 30 to make the second pivot connection axis 61 become the supporting axis for the rotation and movement of position of the chain frame 60. When the chair frame 60 is going to be folded together, the two extension legs 65 that had been inserted into the two positioning holes 35 are just pulled out. After the two extension legs 65 are pulled out, the shock absorber 63 loses supporting force and the chair frame 60 may be also be moved. When the chair frame 60 is going to be folded together, the chair frame 60 may just be drawn in to the direction of the main vehicle frame 30. After being drawn together, the entire chair frame 60 will be leaned over the main vehicle frame 30 as shown in FIG. 5.

Figure 6:
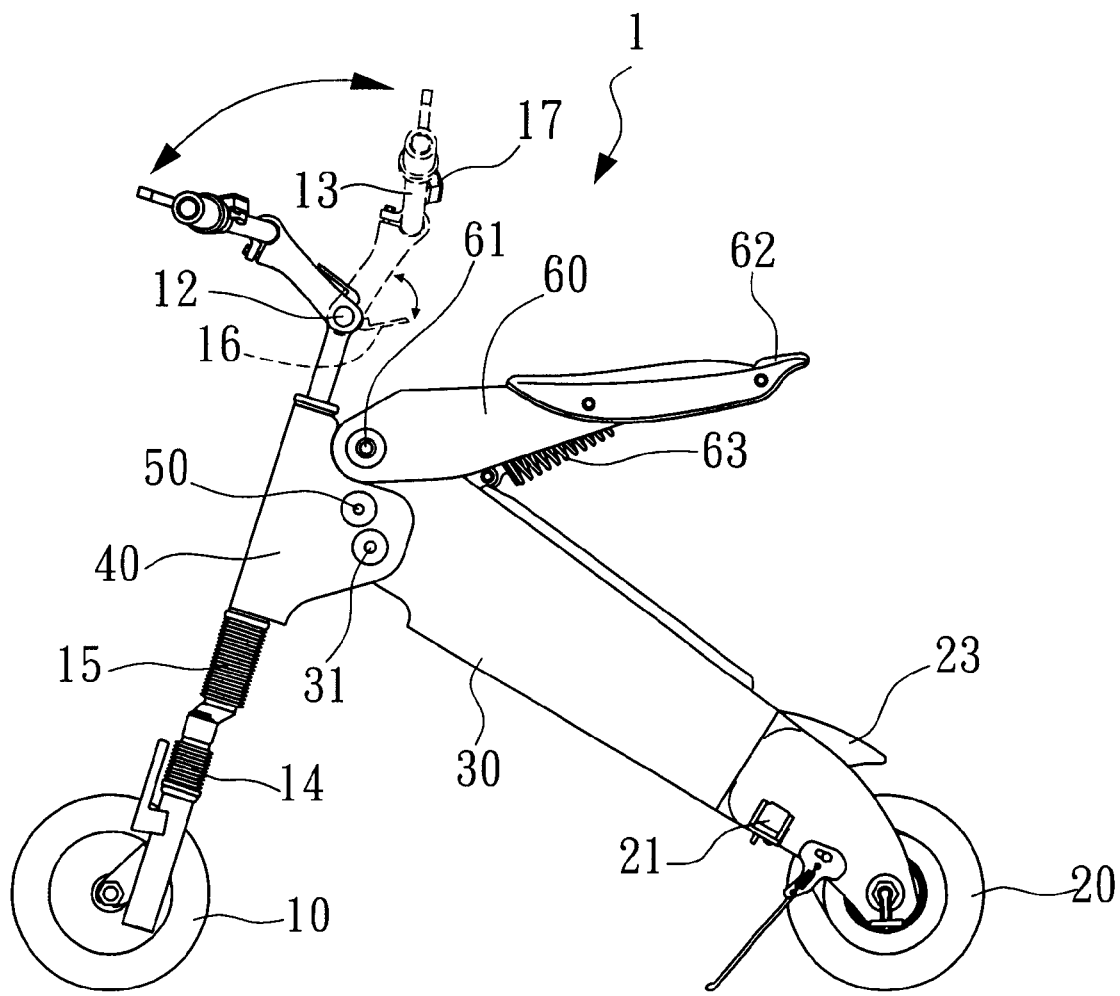
FIG. 6 is an illustration of a preferable embodiment of a handgrip according to the present invention, of which the position is adjusted by a quick taking-apart set.

Please refer to FIG. 6, which is an illustration of a preferable embodiment of a handgrip according to the present invention, of which the position is adjusted by a quick taking-apart set 12. The quick taking-apart set 12 is connected to the top of the direction-changing axis 11 and is connected securely to a pair of handgrips 13. The quick taking-apart set includes a rotation handle 16 that may control the angle and position of the handgrips 13. During adjustment, the rotation handle 16 is pulled upward and a rotation can just be made. By the rotation handle 16, it may make the user adjust an appropriate position for facilitating himself for griping the handgrips 13. In the mean time, it may also provide a preferable manner, when the present invention is formed as a state of folding together.

Figure 7:
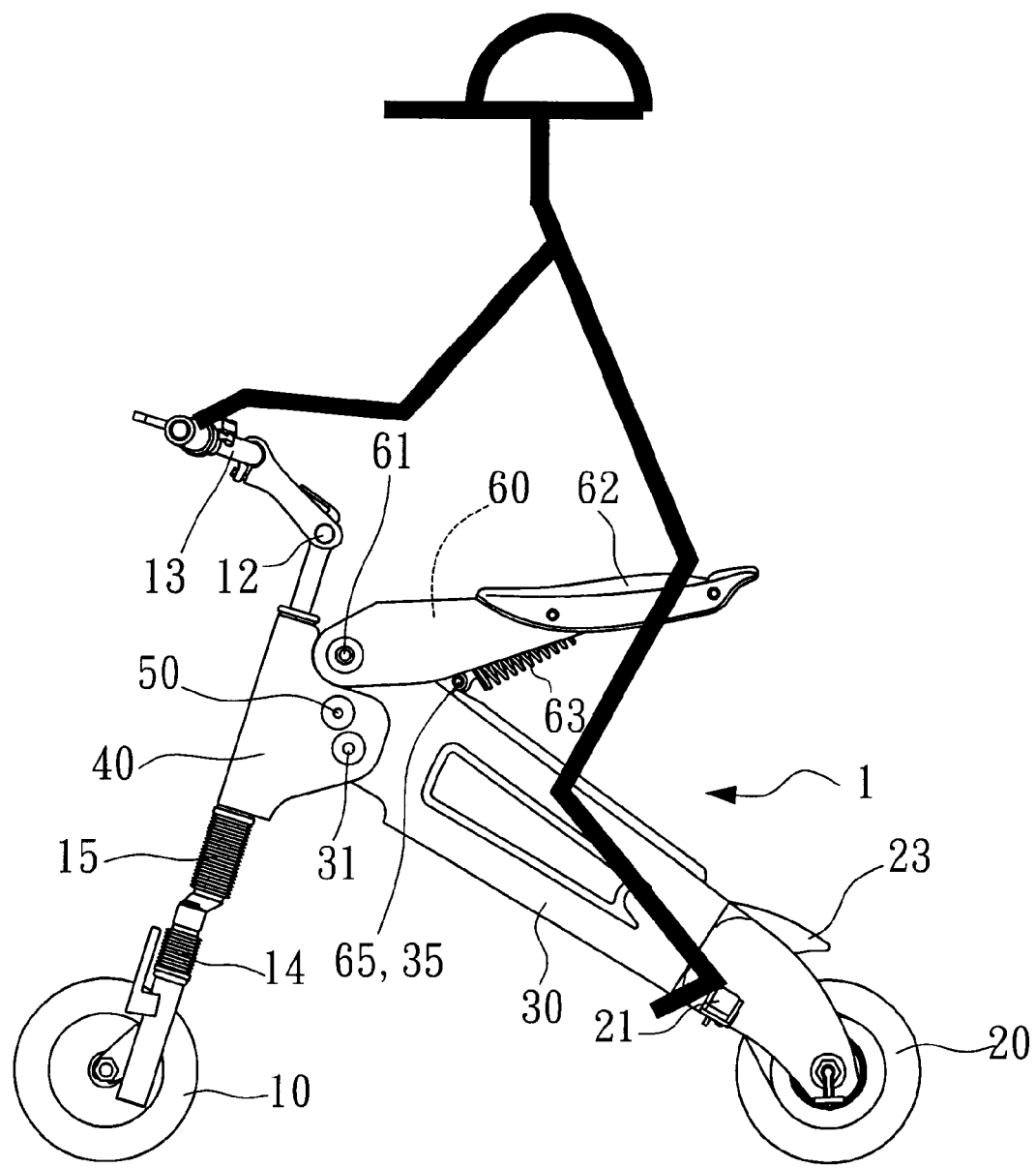
FIG. 7 is an illustration that a user applies a sitting position to execute a preferable embodiment according to the present invention.

Please refer to FIG. 7, which is an illustration that a user applies a sitting position to execute a preferable embodiment according to the present invention. When the user is intended to apply a sitting position, as shown in FIG. 6, the chair frame is pulled to a horizontal level and two extension legs of the adjustable shock absorber 63 are inset and connected in the positioning holes 35 of the main vehicle frame 30. Two feet of the user then straddle on the two treadles respectively. Two hands then grip the handgrips 13 in the two sides. The user sits on the seat cushion 62 of the chair frame 60. At this moment, the user may actuate the vehicle body 1 to move forward.

Figure 8:
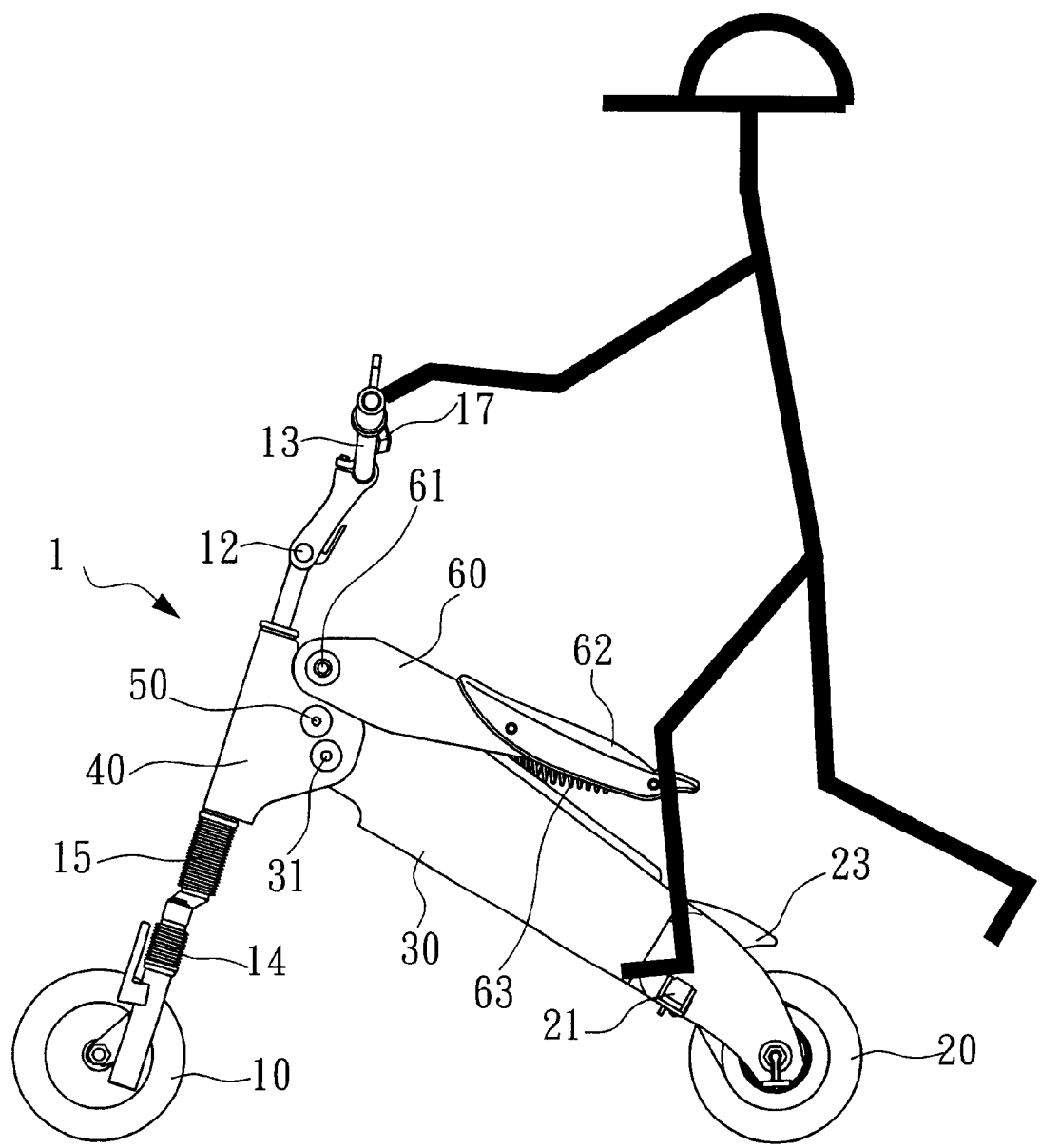
FIG. 8 is an illustration that a user applies a standing-up position to execute a preferable embodiment according to the present invention.

Please refer to FIG. 8, which is an illustration that a user applies a standing-up position to execute a preferable embodiment according to the present invention. When the user applies a standing-up position, as shown in FIG. 8, the adjustable shock absorber 63 is abutted on the internal side wall above the chair frame 60. By doing so, the chair frame 60 may be abutted above the main vehicle frame 30 as described in FIG. 4 and FIG. 5. When the user is in the standing-up position, human body does not need to be crooked, so the entire height is higher. Arms may also be straightened slightly, so the distance between the handgrip 13 and the upper half body of the user is longer. At this time, the adjustable taking-apart set 12 may be pulled backward for facilitating the two hands of the user to grip the handgrips 13. Further, two feet of the user then stand on the two treadles respectively, and at this time, the starter 17 may be started. After the starter 17 is started, the vehicle body 1 is then moved forward. Or, when the user dose not apply the electric power, he can also use one single foot to tread on the ground to make the vehicle body move forward.

Figure 9:
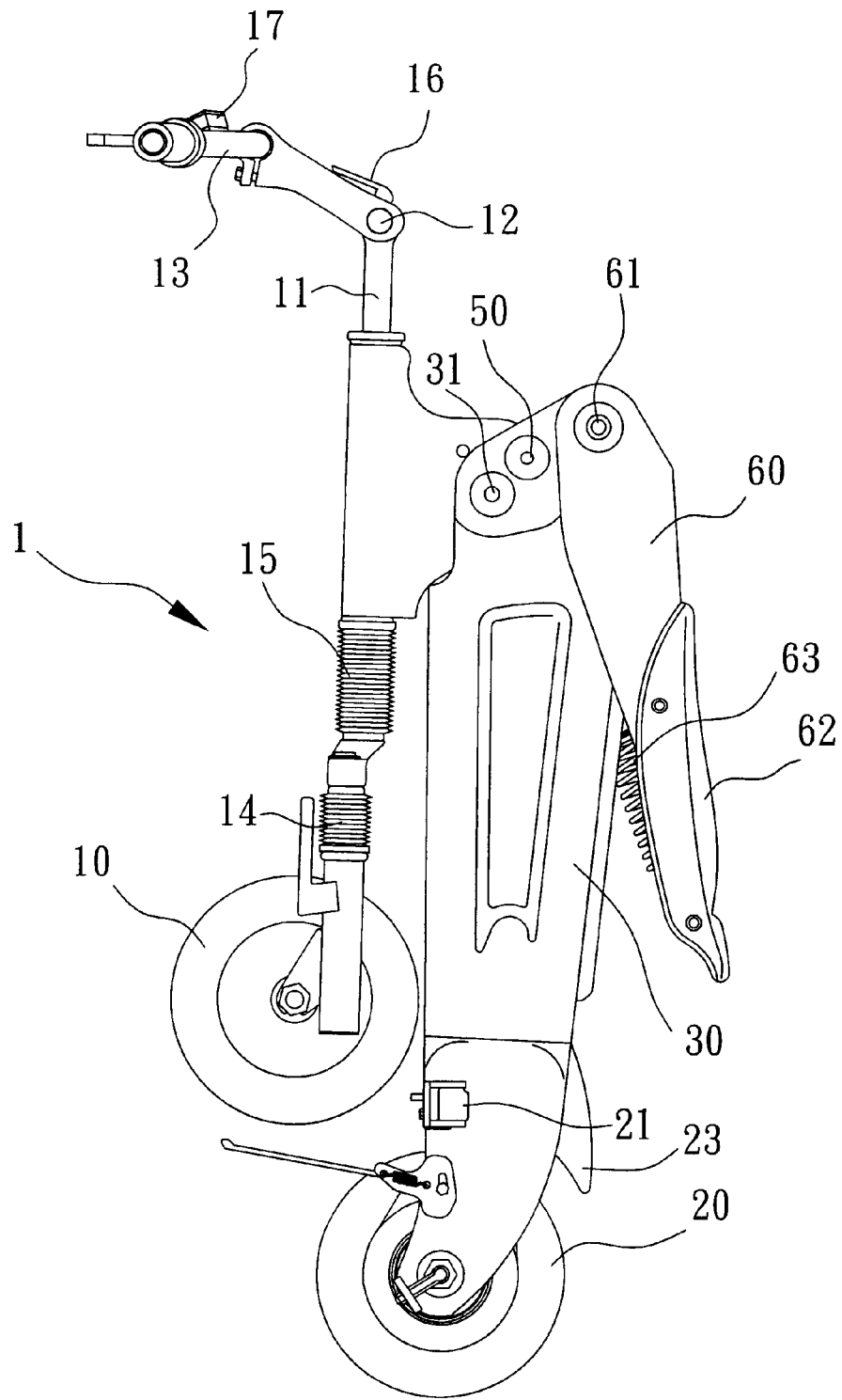
FIG. 9 is an illustration for an embodiment according to the present invention that is folded together.

Please refer to FIG. 9, which is an illustration for an embodiment according to the present invention that is folded together. When the vehicle body 1 is folded together, the chair seat 60 is first leaned together to the main vehicle frame 30. Then, after the fixation knob 50 is turned loose, the main vehicle frame 30 and the rotation axis fixation seat are leaned together. Further, the quick taking-apart set is loosened and the entire handgrips are pulled backward. So, FIG. 8 illustrates a view of folding together formed for the present invention. The entire handgrips 13 may also be pulled to move forward to become another type of folding together after the quick taking-apart set 12 is loosened. When the invention is folded together entirely, it may be placed in a rear trunk of car for the convenience of carrying. Furthermore, the charging terminals designed as the extension of the battery set of the invention may be charged by the source of electric power provided by the car. With this charging manner, it may make the user without worrying about insufficient source of electric power when he is in an activity in the suburbs.

Through the description of the dual-purpose electric vehicle for recreation and travelling according to the present invention, which is a further and greater invention of improvement for the traditional sliding vehicle. Not only it may provide an electric activation for advancing, but also it may save the user the consumption of manpower and provide a seat for the user to be seated on. Furthermore, the invention provide a foldable and closeable structure that not only makes the invention easy to carry but also occupies smaller space and further it is designed to be placed in the rear trunk of the car for facilitating the user to carry. It has extreme improvement and innovation on the structure of vehicle body and it also has the convenience and variation of usage. Furthermore, each component of the invention, such as: the direction-changing axis, the direction-changing axis fixation seat, the quick taking-apart set, the handgrips, the main vehicle frame, and the chair frame, etc. and other components may all be formed or manufactured by the method of a mechanical punching machine.

What is claimed is:

1. A foldable electric vehicle that may be used in either a standing or a sitting position comprising:
    a) a main vehicle frame having a front end and a back end;
    b) a back wheel rotatably mounted on the back end of the main vehicle frame;
    c) an electric drive transmission mechanism on the main vehicle frame and drivingly connected to the back wheel;
    d) a seat frame pivotally attached to the front end of the main vehicle frame at a first pivot, the seat frame having a seat thereon, the seat frame movable between a use position in which the seat is displaced from the main vehicle frame, and a folded position in which the seat is adjacent to a first side of the main vehicle frame;
    e) a fixation seat pivotally attached to the front end of the main vehicle frame at a second pivot spaced from the first pivot, the fixation seat including a direction-changing axis having a front wheel mounted thereto and an upper end, the fixation seat being movable between a use position, in which the front wheel is displaced from the main vehicle frame and a folded position in which the front wheel is adjacent to a second side of the main vehicle frame opposite from the first side;
    f) handgrips adjustably mounted to the upper end of the direction-changing axis; and,
    g) foot treadles mounted on the back end of the main vehicle frame.

2. The foldable electric vehicle of claim 1 further comprising a fixation knob on the fixation seat to secure the fixation seat relative to the main vehicle frame.

3. The foldable electric vehicle of claim 2 wherein the first pivot is located above the second pivot, and the fixation knob is between the first and second pivots.

4. The foldable electric vehicle of claim 1 wherein the first pivot is located above the second pivot.

5. The foldable electric vehicle of claim 1 wherein the main vehicle frame has a hollow cavity and further comprising batteries located in the hollow cavity to supply power to the electric drive transmission.

6. The foldable electric vehicle of claim 1 further comprising a mudguard on the back end of the main vehicle frame adjacent to the back wheel.

7. The foldable electric vehicle of claim 1 wherein the electric drive transmission is connected to the back wheel by a drive belt.

8. The foldable electric vehicle of claim 1 wherein the adjustment of the handgrips is controlled by a knob handle.

9. The foldable electric vehicle of claim 1 further comprising a shock absorber interposed between the front wheel and the direction-changing axis.

10. The foldable electric vehicle of claim 1 further comprising two shock absorbers interposed between the front wheel and the direction-changing axis.

11. The foldable electric vehicle of claim 1 further comprising a shock absorber interposed between the seat frame and the main vehicle frame.

12. The foldable electric vehicle of claim 1 wherein the shock absorber is releasably attached to the main vehicle frame.

* * * * *